US011161257B2

(12) United States Patent
Goto (10) Patent No.: US 11,161,257 B2
(45) Date of Patent: Nov. 2, 2021

(54) ROBOT

(71) Applicant: Seiko Epson Corporation, Tokyo (JP)

(72) Inventor: Yoshinobu Goto, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/911,457

(22) Filed: Jun. 25, 2020

(65) Prior Publication Data

US 2020/0406481 A1    Dec. 31, 2020

(30) Foreign Application Priority Data

Jun. 27, 2019 (JP) .............................. JP2019-119684

(51) Int. Cl.
*B25J 9/00* (2006.01)
*B25J 19/00* (2006.01)

(52) U.S. Cl.
CPC ......... *B25J 19/0025* (2013.01); *B25J 9/0009* (2013.01); *B25J 19/0029* (2013.01)

(58) Field of Classification Search
CPC ... B25J 9/0009; B25J 19/0025; B25J 19/0029
See application file for complete search history.

(56) References Cited

U.S. PATENT DOCUMENTS

| 4,661,040 A * | 4/1987 | Cigna | B21D 43/105 414/744.5 |
|---|---|---|---|
| 4,969,795 A * | 11/1990 | Toyoda | B25J 19/0025 414/744.2 |
| 5,000,653 A * | 3/1991 | Gosdowski | B25J 9/042 414/744.5 |
| 5,205,701 A * | 4/1993 | Kigami | B25J 9/0009 285/305 |
| 5,437,207 A * | 8/1995 | Zimmer | B23K 11/318 414/918 |
| 5,540,541 A * | 7/1996 | Gosdowski | B25J 9/0009 414/744.5 |
| 5,564,312 A * | 10/1996 | Brunman | B25J 19/0029 414/918 |
| 5,658,121 A * | 8/1997 | Hashimoto | B25J 13/00 414/744.1 |
| 5,694,813 A * | 12/1997 | McLaughlan | B25J 19/0029 248/52 |

(Continued)

FOREIGN PATENT DOCUMENTS

JP    2007-044767 A    2/2007

*Primary Examiner* — William Kelleher
*Assistant Examiner* — Gregory T Prather
(74) *Attorney, Agent, or Firm* — Harness, Dickey & Pierce, P.L.C.

(57) ABSTRACT

A robot includes a robot arm, a base supporting the robot arm, and a cable coupled to the base, wherein the base has a housing a circuit board, a connector unit located on a side surface of the housing and electrically coupled to the circuit board, to which the cable is coupled, a cover member having an insertion portion through which the cable is inserted and attached to the side surface of the housing to cover the connector unit, and a wall portion located between a coupling portion by which the cover member is coupled to the side surface of the housing and the connector and provided to project from the side surface of the housing within a space surrounded by the side surface of the housing and the cover member.

7 Claims, 8 Drawing Sheets

(56) References Cited

U.S. PATENT DOCUMENTS

| | | | | |
|---|---|---|---|---|
| 6,477,913 | B1* | 11/2002 | Akeel | B25J 19/0029 414/680 |
| 7,631,573 | B2* | 12/2009 | Kidooka | B25J 19/0025 74/490.02 |
| 9,751,218 | B2* | 9/2017 | Kawase | B25J 9/0009 |
| 10,456,908 | B2* | 10/2019 | Bordegnoni | B25J 9/0009 |
| 11,040,454 | B2* | 6/2021 | Fujioka | B25J 19/005 |
| 11,040,457 | B2* | 6/2021 | Carruthers | B25J 19/00 |
| 2003/0085681 | A1* | 5/2003 | Sakamoto | B25J 9/042 318/568.16 |
| 2004/0144764 | A1* | 7/2004 | Inoue | H02G 11/00 219/137.9 |
| 2004/0179900 | A1* | 9/2004 | Uematsu | H02G 11/00 405/183.5 |
| 2004/0261563 | A1* | 12/2004 | Inoue | B25J 19/0025 74/490.03 |
| 2008/0260510 | A1* | 10/2008 | Iwai | B25J 19/0029 414/787 |
| 2009/0314120 | A1* | 12/2009 | Larsson | B25J 19/0029 74/490.02 |
| 2012/0111135 | A1* | 5/2012 | Ichibangase | B25J 19/0025 74/490.06 |
| 2012/0215356 | A1* | 8/2012 | Igarashi | B25J 9/1628 700/258 |
| 2013/0047771 | A1* | 2/2013 | Liu | B25J 19/0029 74/490.02 |
| 2013/0255428 | A1* | 10/2013 | Hahakura | B25J 18/00 74/490.03 |
| 2013/0260606 | A1* | 10/2013 | Hahakura | B25J 19/0029 439/534 |
| 2014/0020498 | A1* | 1/2014 | Adachi | B25J 18/00 74/490.02 |
| 2014/0137685 | A1* | 5/2014 | Iwayama | B25J 18/00 74/490.02 |
| 2014/0290415 | A1* | 10/2014 | Hasuo | B25J 19/0025 74/490.02 |
| 2015/0007681 | A1* | 1/2015 | Murakami | B25J 19/0025 74/490.02 |
| 2015/0027261 | A1* | 1/2015 | Okahisa | B25J 19/0025 74/490.02 |
| 2015/0027262 | A1* | 1/2015 | Okahisa | B25J 18/00 74/490.02 |
| 2015/0090063 | A1* | 4/2015 | Lantermann | B25J 19/0025 74/490.02 |
| 2015/0096401 | A1* | 4/2015 | Nagai | B25J 9/1674 74/490.02 |
| 2015/0321361 | A1* | 11/2015 | Hahakura | B25J 18/00 74/490.01 |
| 2016/0297081 | A1* | 10/2016 | Watanabe | B25J 19/0025 |
| 2017/0112095 | A1* | 4/2017 | Frost | B25J 9/12 |
| 2017/0182658 | A1* | 6/2017 | Bordegnoni | B25J 9/044 |
| 2017/0259436 | A1* | 9/2017 | Nakayama | B25J 19/0045 |
| 2017/0291313 | A1* | 10/2017 | Inoue | B25J 17/00 |
| 2018/0093376 | A1* | 4/2018 | Teranaka | B25J 9/12 |
| 2018/0182237 | A1* | 6/2018 | Hara | H04B 10/25 |
| 2018/0229360 | A1* | 8/2018 | Adachi | B25J 9/042 |
| 2019/0022851 | A1* | 1/2019 | Konno | B25J 11/0075 |
| 2019/0099880 | A1* | 4/2019 | Niu | B25J 19/0004 |
| 2019/0099883 | A1* | 4/2019 | Niu | B25J 9/12 |
| 2019/0099903 | A1* | 4/2019 | Goto | G08B 5/36 |
| 2019/0134810 | A1* | 5/2019 | Goto | B25J 19/0029 |
| 2019/0152073 | A1* | 5/2019 | Yamazaki | B25J 19/0029 |
| 2019/0299427 | A1* | 10/2019 | Nakayama | B25J 19/0029 |
| 2019/0329428 | A1* | 10/2019 | Sakurai | B25J 18/00 |
| 2019/0381596 | A1* | 12/2019 | Sakurai | G05B 19/4155 |
| 2020/0009722 | A1* | 1/2020 | Yamashiro | B25J 9/06 |
| 2020/0156239 | A1* | 5/2020 | Fujioka | B25J 19/0029 |
| 2020/0238543 | A1* | 7/2020 | Shimizu | H02G 11/00 |
| 2020/0290212 | A1* | 9/2020 | Fujioka | B25J 19/0029 |
| 2020/0307000 | A1* | 10/2020 | Maeda | B25J 19/0029 |
| 2020/0307001 | A1* | 10/2020 | Komatsu | B25J 19/0091 |
| 2020/0406451 | A1* | 12/2020 | Kurokawa | B25J 9/0009 |
| 2021/0016432 | A1* | 1/2021 | Mizukoshi | F16C 33/768 |
| 2021/0053237 | A1* | 2/2021 | Hashizume | B25J 19/0041 |
| 2021/0069895 | A1* | 3/2021 | Watanabe | B25J 19/0025 |
| 2021/0129360 | A1* | 5/2021 | Fjallstrom | B25J 13/088 |
| 2021/0143619 | A1* | 5/2021 | Fujioka | H02G 3/088 |
| 2021/0157296 | A1* | 5/2021 | Ohtsubo | B25J 19/0029 |

* cited by examiner

ROBOT

The present application is based on, and claims priority from JP Application Serial Number 2019-119684, filed Jun. 27, 2019, the disclosure of which is hereby incorporated by reference herein in its entirety.

BACKGROUND

1. Technical Field

The present disclosure relates to a robot.

2. Related Art

Recently, in factories, due to labor cost rise and labor shortage, work manually performed in the past has been increasingly automated by various robots and robot peripherals. The various robots include e.g. bases and arms supported by the bases as shown in JP-A-2007-44767.

In the robot disclosed in JP-A-2007-44767, a power feed cable coupling connector is provided in an outer surface of the base. An external power supply cable is coupled to the power feed cable coupling connector, and thereby, power may be supplied to the robot and the robot may be driven.

Further, in the robot disclosed in JP-A-2007-44767, a connector having a waterproof function is used as the power feed cable coupling connector, and a cable having a waterproof function is also used for the cable coupled to the power feed cable coupling connector.

However, to provide a waterproof function to a coupling portion of a robot without the waterproof function, the connector and the cable as shown in JP-A-2007-44767 are necessary and the structure becomes complex.

SUMMARY

The present disclosure can be implemented as below.

A robot according to an application example includes a robot arm, a base supporting the robot arm, and a cable coupled to the base, wherein the base has a housing housing a circuit board, a connector unit located on a side surface of the housing and electrically coupled to the circuit board, to which the cable is coupled, a cover member having an insertion portion through which the cable is inserted and attached to the side surface of the housing to cover the connector unit, and a wall portion located between a coupling portion by which the cover member is coupled to the side surface of the housing and the connector unit and provided to project from the side surface of the housing within a space surrounded by the side surface of the housing and the cover member.

DESCRIPTION OF EXEMPLARY EMBODIMENTS

As below, a robot according to the present disclosure will be explained in detail based on preferred embodiments shown in the accompanying drawings.

First Embodiment

Figure 1:
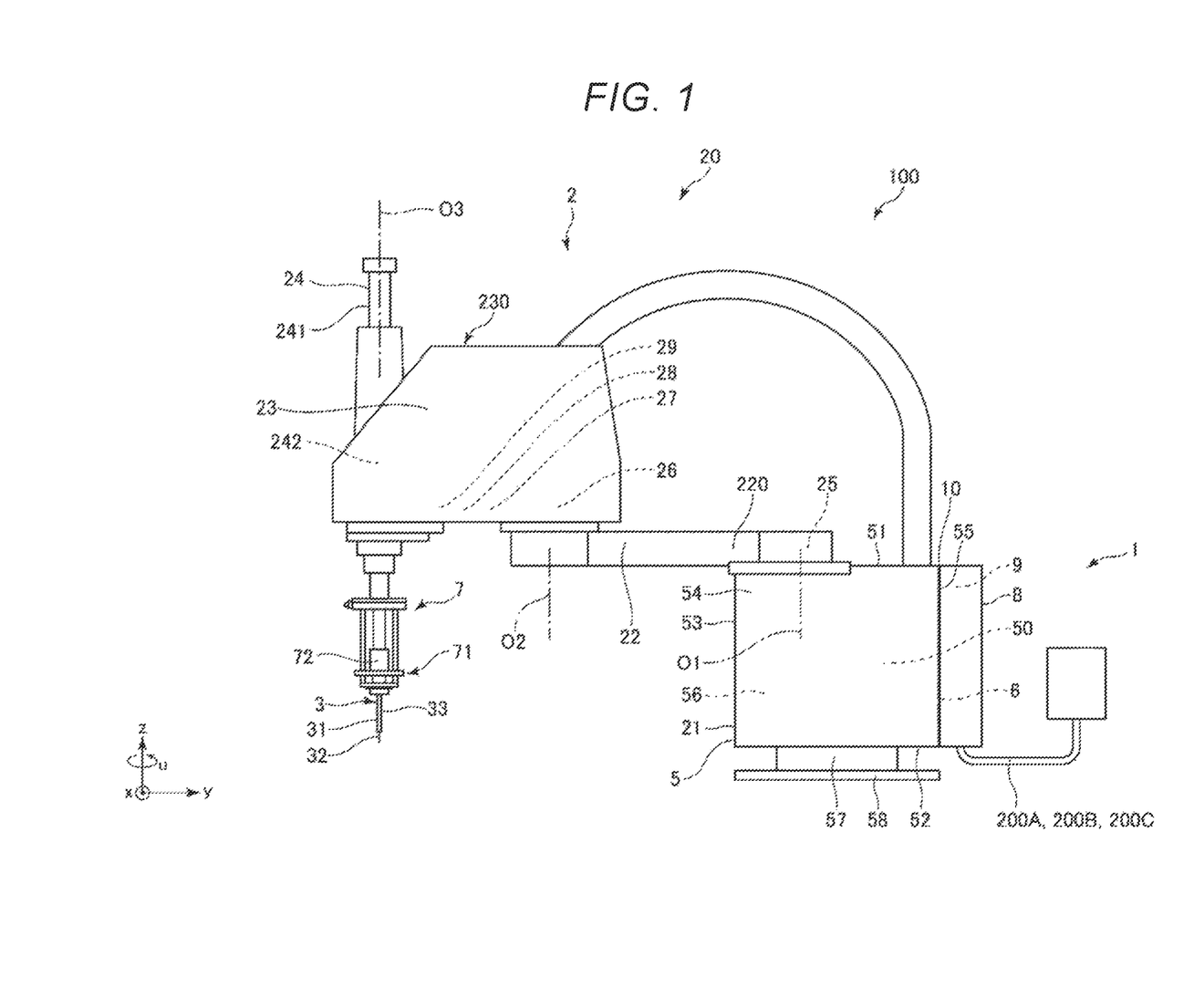
FIG. 1 is a side view showing a first embodiment of a robot system including a robot according to the present disclosure.
Figure 2:
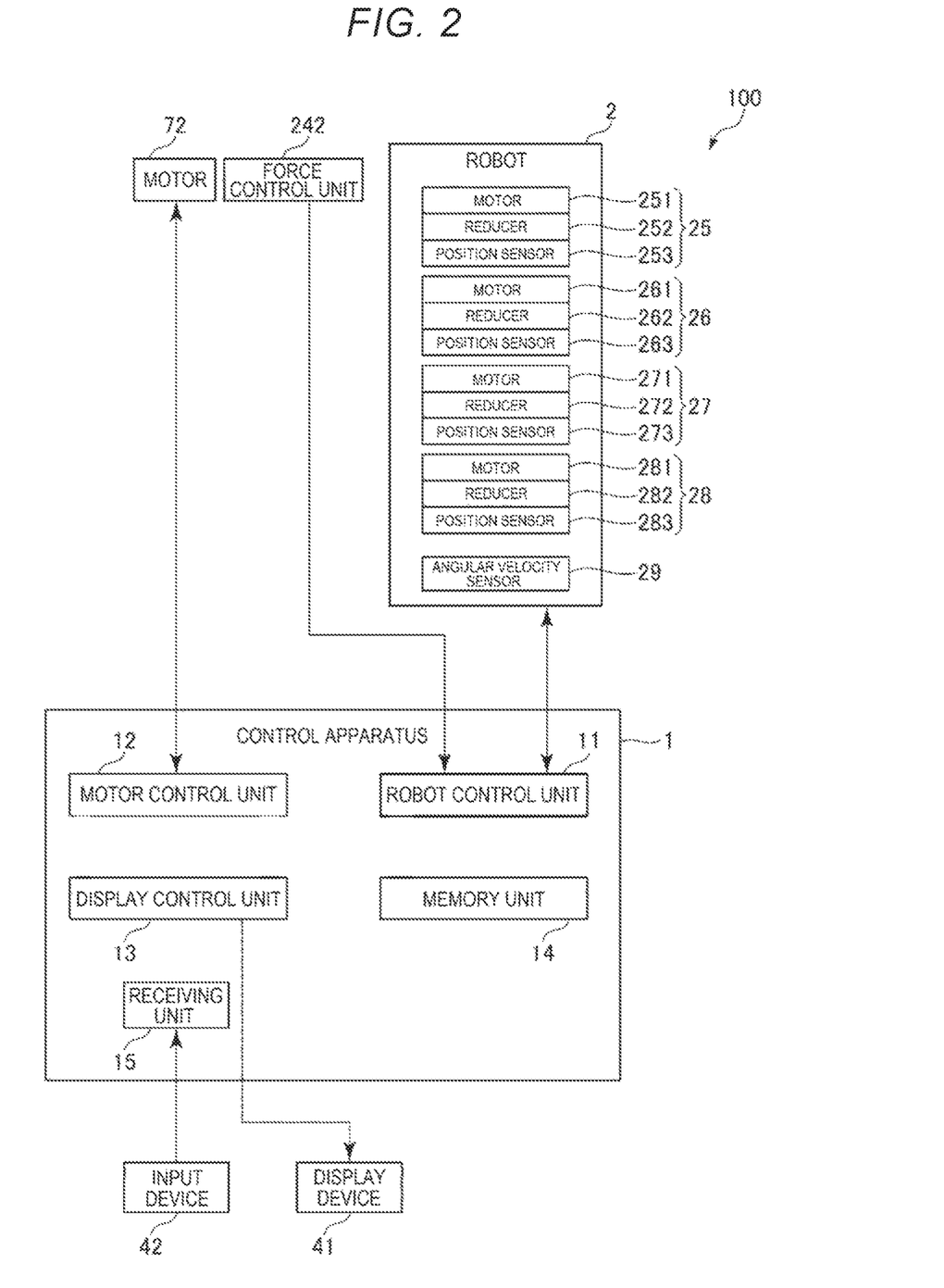
FIG. 2 is a block diagram of the robot system shown in FIG. 1.
Figure 3:
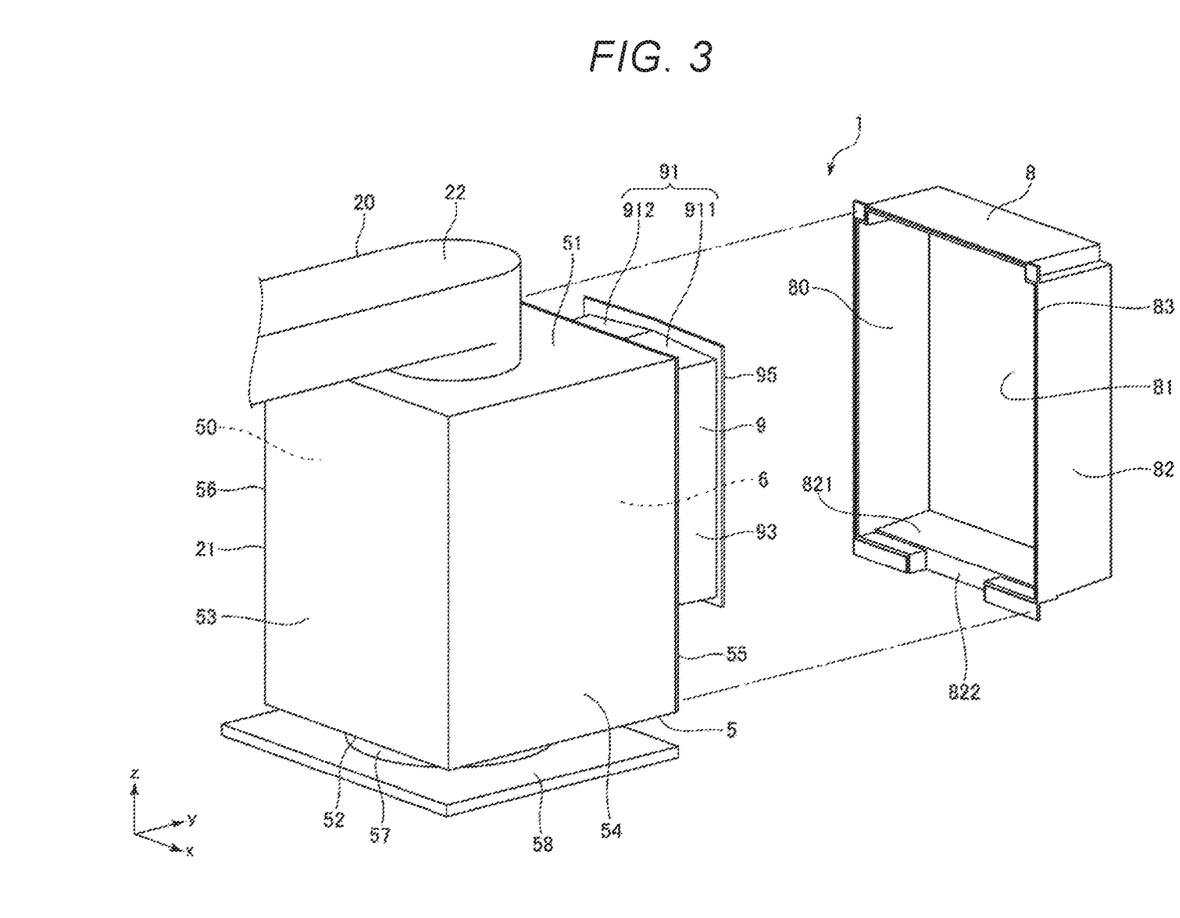
FIG. 3 is a perspective view of a base shown in FIG. 1.
Figure 4:
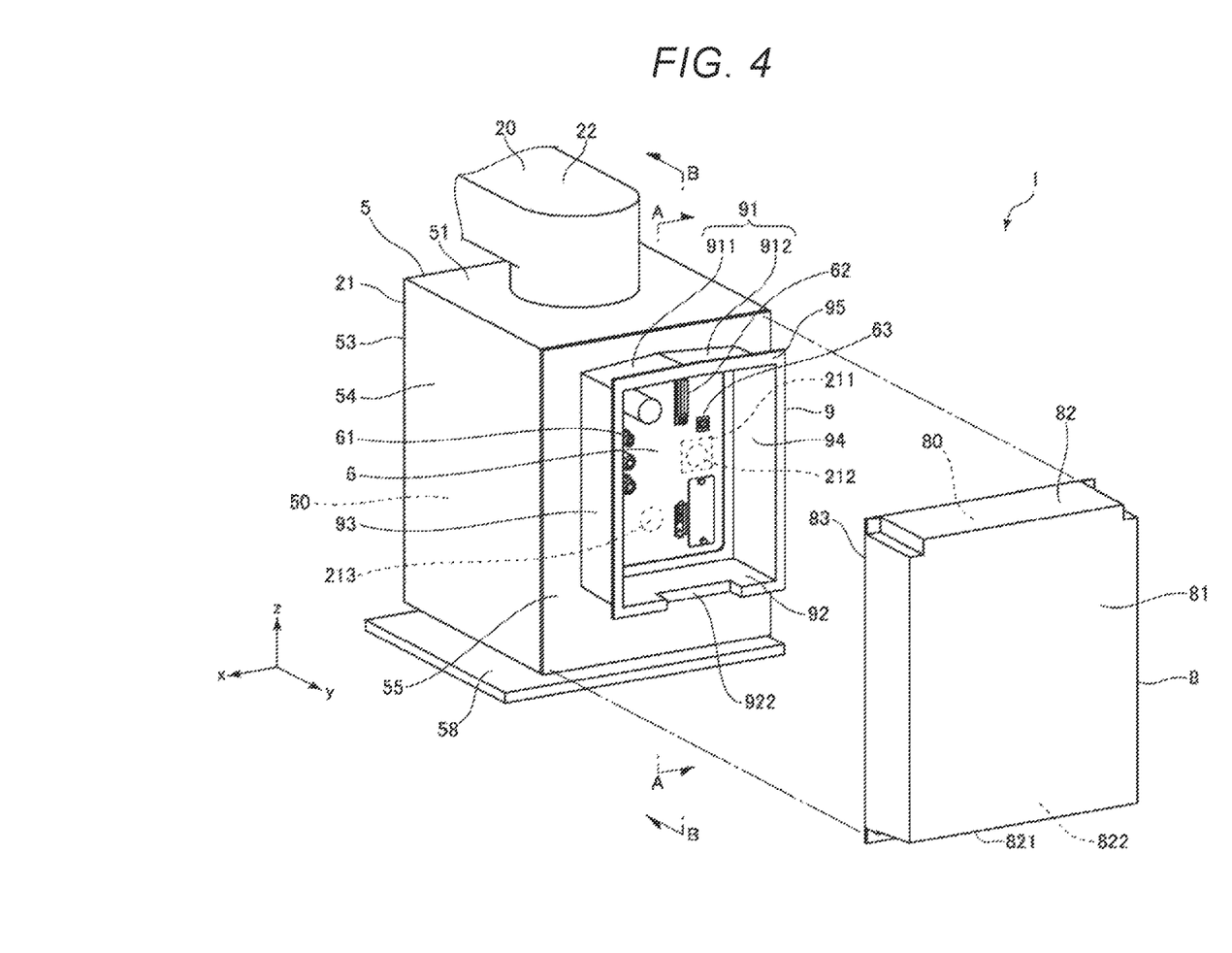
FIG. 4 is a perspective view of the base shown in FIG. 1.
Figure 5:
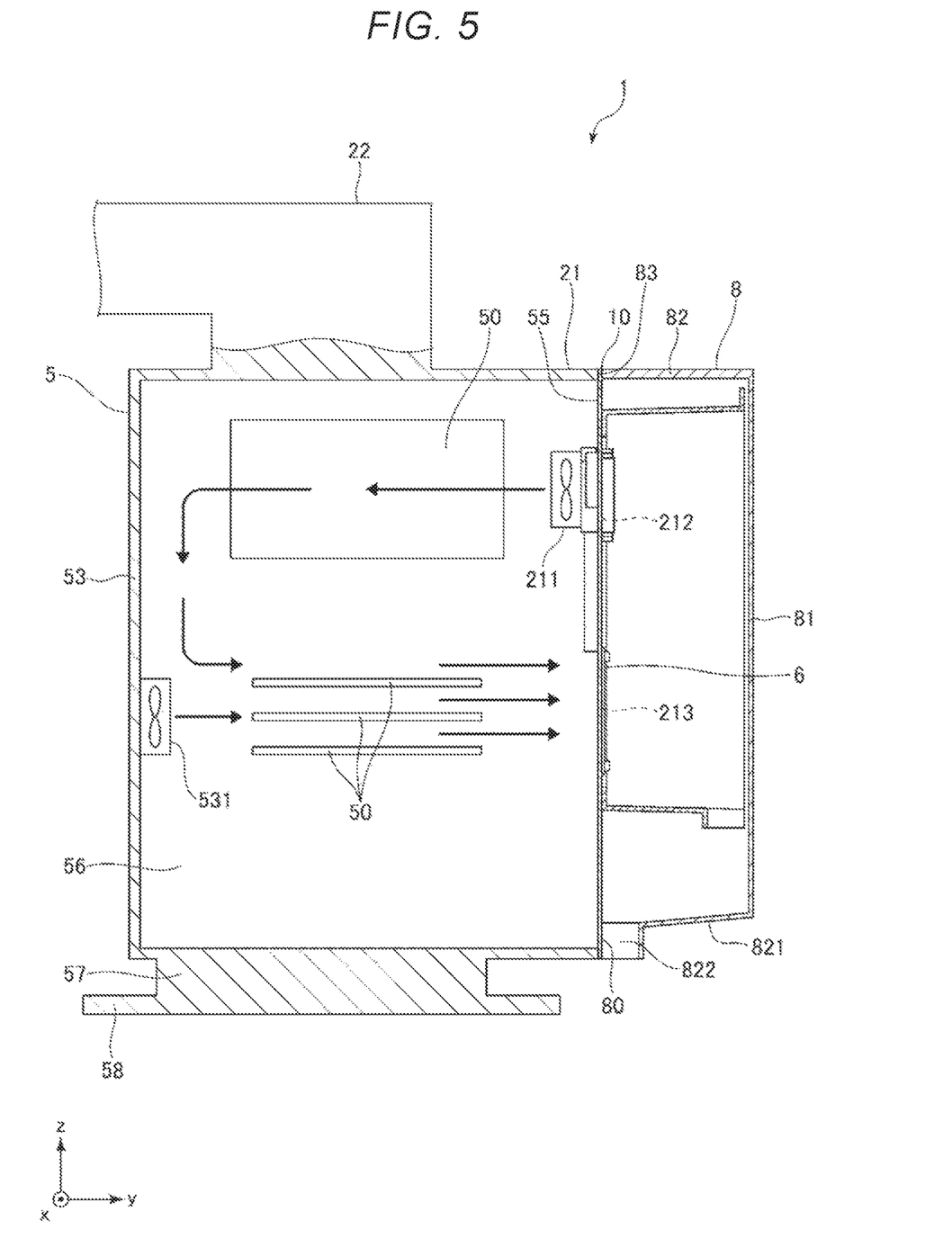
FIG. 5 is a sectional view along line B-B in FIG. 4.
Figure 6:
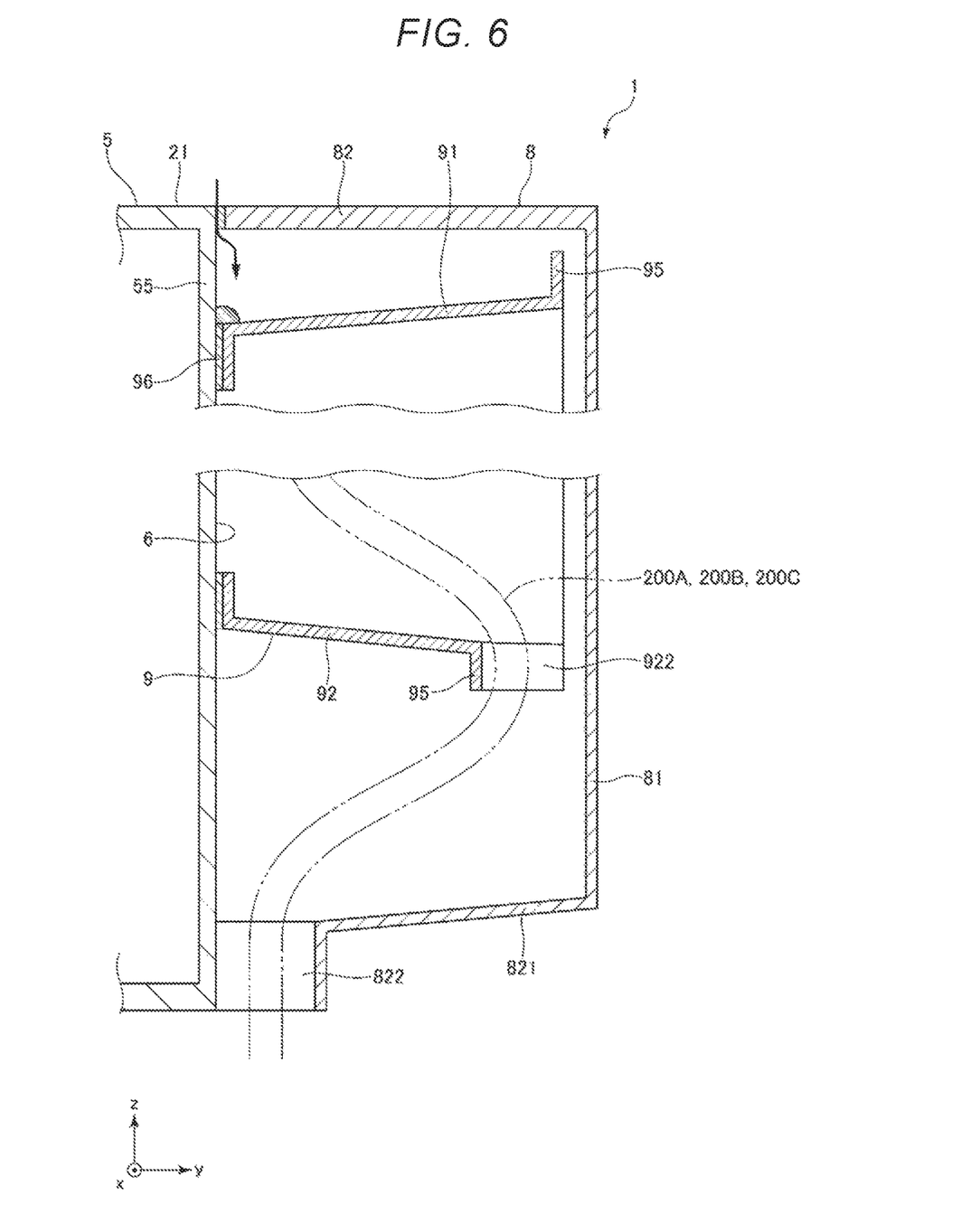
FIG. 6 is a partially enlarged view of the sectional view shown in FIG. 5.
Figure 7:
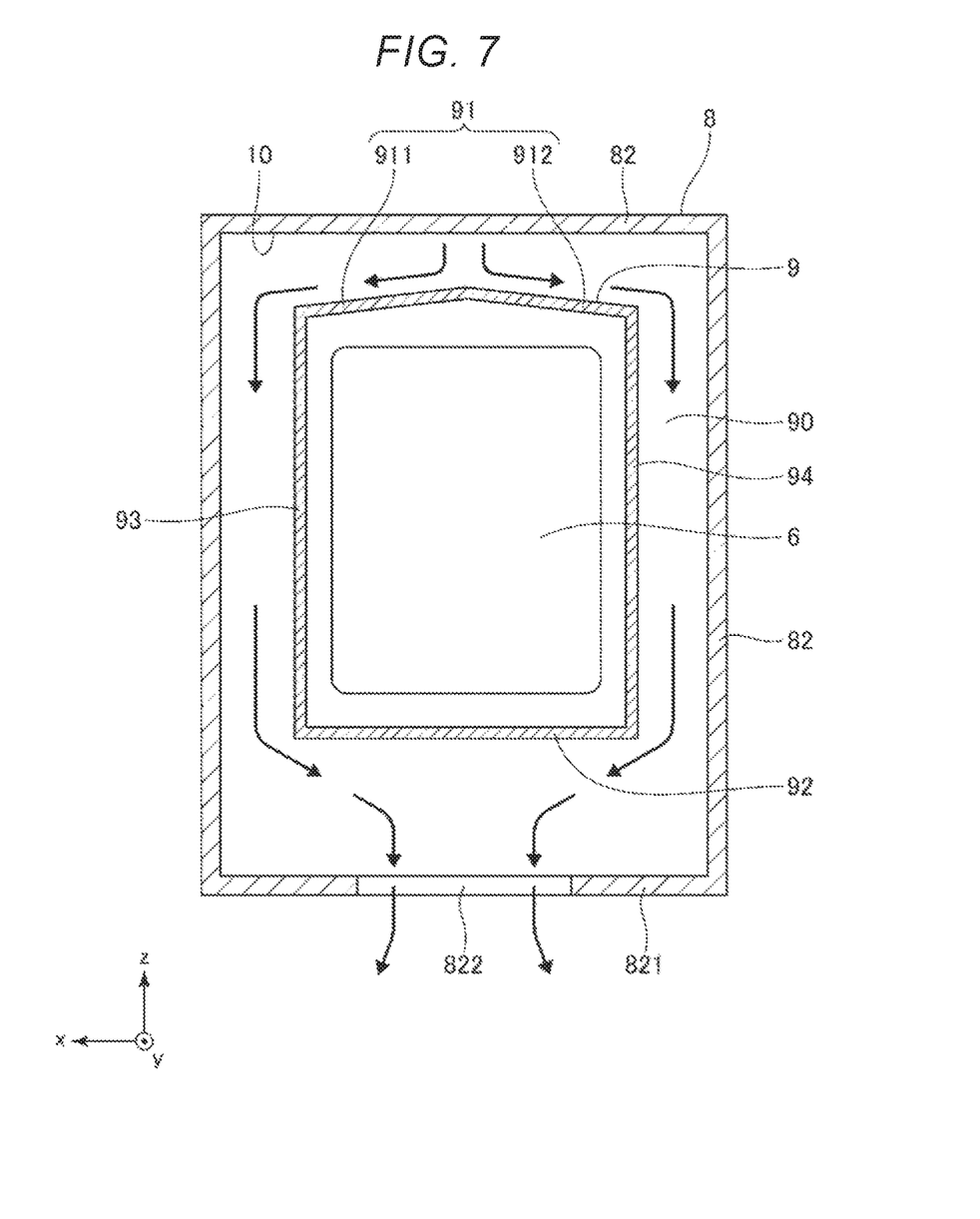
FIG. 7 is a sectional view along line A-A in FIG. 4.

FIG. 1 is the side view showing the first embodiment of the robot system including the robot according to the present disclosure. FIG. 2 is the block diagram of the robot system shown in FIG. 1. FIG. 3 is the perspective view of the base shown in FIG. 1. FIG. 4 is the perspective view of the base shown in FIG. 1. FIG. 5 is the sectional view along line B-B in FIG. 4. FIG. 6 is the partially enlarged view of the sectional view shown in FIG. 5. FIG. 7 is the sectional view along line A-A in FIG. 4.

In FIGS. 1 and 3 to 8, for convenience of explanation, an x-axis, a y-axis, and a z-axis are shown as three axes orthogonal to one another. Hereinafter, directions parallel to the x-axis are also referred to as "x-directions", directions parallel to the y-axis are also referred to as "y-directions", and directions parallel to the z-axis are also referred to as "z-directions". Further, hereinafter, the head sides of the respective arrows are referred to as "+(plus)" and tail sides are referred to as "−(minus)", a direction parallel to the +x-axis direction is also referred to as "+x-axis direction", a direction parallel to the −x-axis direction is also referred to as "−x-axis direction", a direction parallel to the +y-axis direction is also referred to as "+y-axis direction", a direction parallel to the −y-axis direction is also referred to as "−y-axis direction", a direction parallel to the +z-axis direction is also referred to as "+z-axis direction", and a direction parallel to the −z-axis direction is also referred to as "−z-axis direction". Furthermore, a direction about the z-axis and a direction about an axis parallel to the z-axis are also referred to as "u-axis directions".

Hereinafter, for convenience of explanation, the +z-axis direction in FIG. 1, i.e., the upside is also referred to as "upper" or "above" and the −z-axis direction, i.e., the downside is also referred to as "lower" or "below". Further, regarding a robot arm 20, a side of a base 21 in FIG. 1 is referred to as "proximal end" and the opposite side, i.e., a side of an end effector 7 is referred to as "distal end". Furthermore, the z-axis directions in FIG. 1, i.e., upward and downward directions are referred to as "vertical directions" and the x-directions and the y-directions, i.e., leftward and rightward directions are referred to as "horizontal directions".

A robot system 100 shown in FIGS. 1 and 2 is an apparatus used for work of e.g. holding, transport, assembly, inspection, etc. of works including electronic components and electronic apparatuses. The robot system 100 includes a control apparatus 1, a robot 2, and the end effector 7. Additionally, the robot system 100 includes a display device 41, an input device 42, etc.

The control apparatus 1 is placed in a position different from that of the robot 2, i.e., outside of the robot 2. Further, in the illustrated configuration, the robot 2 and the control apparatus 1 are electrically coupled (hereinafter, simply referred to as "coupled") by a cable 200A, a cable 200B, and a cable 200C, however, the cable 200A to cable 200C may be omitted for wireless communication. That is, the robot 2 and the control apparatus 1 may be coupled in wired communication or coupled in wireless communication. Further, the control apparatus 1 may be provided inside of the base 21 of the robot 2.

In the illustrated configuration, the robot 2 is a horizontal articulated robot, i.e., a scalar robot.

As shown in FIG. 1, the robot 2 includes the base 21, a first arm 22, a second arm 23, a third arm 24 as a working head, and a force detection unit 242. The first arm 22, the second arm 23, and the third arm 24 form the robot arm 20.

Further, the robot 2 includes a drive unit 25 that rotates the first arm 22 relative to the base 21, a drive unit 26 that rotates the second arm 23 relative to the first arm 22, a u-drive unit 27 that rotates a shaft 241 of the third arm 24 relative to the second arm 23, a z-drive unit that moves the shaft 241 in the z-axis directions relative to the second arm 23, and an angular velocity sensor 29 shown in FIG. 2.

As described above, the robot 2 includes the base 21 rotatably supporting the robot arm 20, and the robot arm 20 includes the first arm 22 and the second arm 23 located at the distal side of the first arm 22 with respect to the base 21. Thereby, the movable range of the robot arm 20 may be increased.

As shown in FIGS. 1 and 2, the drive unit 25 is provided within a housing 220 of the first arm 22, and has a motor 251 that generates a driving force, a reducer 252 that reduces the driving force of the motor 251, and a position sensor 253 that detects the rotation angle of the rotation shaft of the motor 251 or the reducer 252.

The drive unit 26 is provided within a housing 230 of the second arm 23, and has a motor 261 that generates a driving force, a reducer 262 that reduces the driving force of the motor 261, and a position sensor 263 that detects the rotation angle of the rotation shaft of the motor 261 or the reducer 262.

The u-drive unit 27 is provided within the housing 230 of the second arm 23, and has a motor 271 that generates a driving force, a reducer 272 that reduces the driving force of the motor 271, and a position sensor 273 that detects the rotation angle of the rotation shaft of the motor 271 or the reducer 272.

The z-drive unit 28 is provided within the housing 230 of the second arm 23, and has a motor 281 that generates a driving force, a reducer 282 that reduces the driving force of the motor 281, and a position sensor 283 that detects the rotation angle of the rotation shaft of the motor 281 or the reducer 282.

As the motor 251, the motor 261, the motor 271, and the motor 281, e.g. servo motors such as AC servo motors or DC servo motors may be used.

As the reducer 252, the reducer 262, the reducer 272, and the reducer 282, e.g. planet-gear reducers, wave gearings, or the like may be used. As the position sensor 253, the position sensor 263, the position sensor 273, and the position sensor 283, e.g. angle sensors may be used.

The drive unit 25, the drive unit 26, the u-drive unit 27, and the z-drive unit 28 are respectively coupled to corresponding motor drivers (not shown) and controlled by a robot control unit 11 of the control apparatus 1 via the motor drivers.

As shown in FIG. 1, the angular velocity sensor 29 is provided inside of the second arm 23. Accordingly, the angular velocity of the second arm 23 may be detected. The control apparatus 1 performs control of the robot 2 based on information of the detected angular velocity.

The base 21 is fixed to e.g. a floor surface as a placement surface (not shown) by bolts or the like. The first arm 22 is coupled to the upper end portion of the base 21. The first arm 22 is rotatable about a first axis O1 along the vertical directions relative to the base 21. When the drive unit 25 that rotates the first arm 22 is driven, the first arm 22 rotates about the first axis O1 within the horizontal plane relative to the base 21. The position sensor 253 is configured to detect the amount of rotation of the first arm 22 relative to the base 21.

The second arm 23 is coupled to the distal end portion of the first arm 22. The second arm 23 is rotatable about a second axis O2 along the vertical directions relative to the first arm 22. The axial direction of the first axis O1 and the axial direction of the second axis O2 are the same. That is, the second axis O2 is parallel to the first axis O1. When the drive unit 26 that rotates the second arm 23 is driven, the second arm 23 rotates about the second axis O2 within the horizontal plane relative to the first arm 22. The position sensor 263 may detect the amount of drive, specifically, the amount of rotation of the second arm 23 relative to the first arm 22.

The third arm 24 is placed and supported in the distal end portion of the second arm 23. The third arm 24 has the shaft 241. The shaft 241 is rotatable about a third axis O3 along the vertical directions relative to the second arm 23 and movable in the upward and downward directions. The shaft 241 is an arm at the most distal end of the robot arm 20.

When the u-drive unit 27 that rotates the shaft 241 is driven, the shaft 241 forwardly and reversely rotates about the z-axis, that is, turns. The position sensor 273 may detect the amount of rotation of the shaft 241 relative to the second arm 23.

When the z-drive unit 28 that moves the shaft 241 in the z-axis directions is driven, the shaft 241 moves in the upward and downward directions, i.e., the z-axis directions. The position sensor 283 may detect the amount of movement of the shaft 241 in the z-axis directions relative to the second arm 23.

Various end effectors are detachably coupled to the distal end portion of the shaft 241. The end effectors are not particularly limited to, but include e.g. an end effector that grips an object to be transported, an end effector that processes a workpiece, an end effector used for an inspection, etc. In the embodiment, the end effector is detachably coupled. The end effector 7 will be described later in detail.

Note that the end effector 7 is not a component element of the robot 2 in the embodiment, however, a part or all of the end effector 7 may be a component element of the robot 2. Further, the end effector 7 is not a component element of the robot arm 20 in the embodiment, however, a part or all of the end effector 7 may be a component element of the robot arm 20.

As shown in FIG. 1, the end effector 7 has an attachment portion 71 attached to the shaft 241, a motor 72 provided in the attachment portion 71, and a screw limit gauge 3 detachably and coaxially attached to the rotation shaft of the motor 72. The end effector 7 is detachably coupled to the distal end portion of the shaft 241.

The screw limit gauge 3 is an example of a screw gauge and has a columnar grip portion 31, a passing-side gauge 32 provided at one end of the grip portion 31 with a male thread formed thereon, a stopping-side gauge 33 provided in the other end of the grip portion 31 with a male thread formed thereon. Regarding the screw limit gauge 3, when the passing-side gauge 32 is used, the end of the grip portion 31 at which the stopping-side gauge 33 is provided is attached to the rotation shaft of the motor 72, and the passing-side gauge 32 is placed at the distal end side. Or, when the stopping-side gauge 33 is used, the end of the grip portion 31 at which the passing-side gauge 32 is provided is attached to the rotation shaft of the motor 72, and the stopping-side gauge 33 is placed at the distal end side.

The motor 72 is not particularly limited, but e.g. a servo motor such as an AC servo motor or DC servo motor, stepping motor, or the like is used.

Further, the end effector 7 has an angle sensor (not shown) that detects the rotation angle of the rotation shaft of the motor 72, and the angle sensor may detect the rotation angle of the rotation shaft of the motor 72.

The force detection unit 242 includes e.g. a force sensor that detects a force applied to the third arm 24 or the like.

In the end effector 7, compared to a case where a power transmission mechanism including a gear and a belt intervenes between the rotation shaft of the motor 72 and the screw limit gauge 3, lowering of the rotation accuracy due to backlash may be suppressed.

Note that the screw limit gauge 3 is not limited to that having the above described configuration, but may have e.g. a configuration in which a screw limit gauge having only a passing-side gauge and a screw limit gauge having only a stopping-side gauge are replaced by each other and used.

In the embodiment, the end effector 7 is detachable from the robot arm 20, however, for example, the end effector 7 may be undetachable from the robot arm 20.

In the robot 2, the control apparatus 1 is coupled via the cable 200A, the cable 200B, and the cable 200C.

As shown in FIG. 2, the control apparatus 1 includes the robot control unit 11, a motor control unit 12 (end effector control unit), a display control unit 13, a memory unit 14, and a receiving unit 15, and respectively controls driving of the respective parts of the robot system 100 including the robot 2, the motor 72 of the end effector 7, and the display device 41.

Further, the control apparatus 1 is configured to be respectively communicable among the robot control unit 11, the motor control unit 12, the display control unit 13, the memory unit 14, and the receiving unit 15. That is, the robot control unit 11, the motor control unit 12, the display control unit 13, the memory unit 14, and the receiving unit 15 are coupled to one another in wired or wireless communication.

The robot control unit 11 controls driving of the robot 2, i.e., driving of the robot arm 20 etc. The robot control unit 11 is a computer in which programs of OS etc. are installed. The robot control unit 11 has e.g. a CPU as a processor, a RAM, and a ROM in which the programs are stored. Further, the function of the robot control unit 11 may be realized by e.g. execution of various programs using the CPU.

The motor control unit 12 controls driving of the motor 72. The motor control unit 12 is a computer in which programs of OS etc. are installed. The motor control unit 12 has e.g. a CPU as a processor, a RAM, and a ROM in which the programs are stored. Further, the function of the motor control unit 12 may be realized by e.g. execution of various programs using the CPU.

The display control unit 13 has a function of displaying various screens such as windows, characters, etc. on the display device 41. That is, the display control unit 13 controls driving of the display device 41. The function of the display control unit 13 may be realized by e.g. a GPU or the like.

The memory unit 14 has a function of storing various kinds of information including data and programs. The memory unit 14 stores control programs etc. The function of the memory unit 14 may be realized by the so-called external memory device such as a ROM.

The receiving unit 15 has a function of receiving input from the input device 42. The function of the receiving unit 15 may be realized using e.g. an interface circuit. Note that, for example, when a touch panel is used, the receiving unit 15 has a function as an input sensing unit that senses contact of a user's finger with the touch panel or the like.

The display device 41 includes a monitor (not shown) formed using e.g. a liquid crystal display, EL display, or the like, and has a function of displaying various images including various screens such as windows, characters, etc.

The input device 42 includes e.g. a mouse, keyboard, etc. Therefore, the user operates the input device 42, and thereby, may give instructions of various kinds of processing etc. to the control apparatus 1.

Specifically, the user may give instructions to the control apparatus 1 by an operation of clicking the various screens such as windows displayed on the display device 41 with the mouse of the input device 42 and an operation of inputting characters, numerals, etc. with the keyboard of the input device 42.

Note that, in the embodiment, in place of the display device 41 and the input device 42, a display input device serving as both the display device 41 and the input device 42 may be provided. As the display input device, e.g. a touch panel such as an electrostatic touch panel or pressure-sensitive touch panel may be used. Or, the input device 42 may recognize sound including voice.

Next, the base 21 will be explained in detail.

As shown in FIGS. 3 to 7, the base 21 has a housing 5, a connector unit 6, a cover member 8, and a shielding part 9.

The housing 5 is formed by a box body having a top plate 51, a bottom plate 52, and four side plates 53, 54, 55, 56. The top plate 51 supports the first arm 22. The bottom plate 52 is coupled to a placement board 58 via a spacer 57. The placement board 58 is placed and fixed onto e.g. a floor or the like. The side plate 53 is located at the −y-axis side, the side plate 54 is located at the +x-axis side, the side plate 55 is located at the +y-axis side, and the side plate 56 is located at the −x-axis side.

Further, an air intake port 212 and an exhaust port 213, which will be described later, are provided in the side plate 55. These air intake port 212 and exhaust port 213 are sequentially placed in juxtaposition from the +z-axis side.

The housing 5 houses a plurality of circuit boards 50 inside. The plurality of circuit boards 50 are stacked apart from each other along the z-axis directions or placed so that the thickness direction may be parallel to the x-axis. The circuit boards 50 include a voltage converter board, inverter board, performance monitoring board, motor power supply control board, and control board. Note that the types of the boards are not limited to those. Further, the housing 5 also houses a regenerative resistor (not shown) etc.

As shown in FIG. 5, the side plate 55 has the air intake port 212 formed by a through hole. Inside of the side plate 55, a fan 211 is placed to cover the air intake port 212. By actuation of the fan 211, air may be taken into the housing 5 via the air intake port 212 as shown by arrows in FIG. 5. Further, an air flow may be generated in the −y-axis direction.

A fan 531 is placed on the inner surface of the side plate 53. The fan 531 sends the air in the +y-axis direction. The air may be circulated as shown by the arrows in FIG. 5 using the fan 211 and the fan 531. That is, the air may be taken from the air intake port 212 and the air may be circulated within the housing 5 and exhausted from the exhaust port 213. By the air circulation, heat of the plurality of circuit boards 50 located in the circulation path may be dissipated.

As shown in FIGS. 4 and 5, the connector unit 6 is provided on the outer surface of the side plate 55. That is, the connector unit 6 is located on the side surface of the housing 5. The connector unit 6 has a plurality of, in the illustrated configuration, three connectors 61, 62, 63. In the embodiment, the connectors 61 to 63 are embedded in the side plate 55. Further, the connectors 61 to 63 are respectively exposed to the outer surface and the inner surface of the side plate 55. Note that, not limited to the configuration, but the side plate 55 may have an opening and a board in which the connectors 61 to 63 are embedded is buried in the opening. The description that the connector unit 6 is located on the side surface of the housing 5 includes this configuration.

The cable 200A is coupled to the connector 61, the cable 200B is coupled to the connector 62, and the cable 200C is coupled to the connector 63. Further, the connector 61 to connector 63 are respectively coupled to the plurality of circuit boards 50 by interconnections (not shown). The cable 200A to cable 200C are detachably coupled to the connector 61 to connector 63.

As shown in FIGS. 3 to 6, the cover member 8 is attached, that is, coupled to the side plate 55 of the housing 5 to cover the connector unit 6. As shown in FIG. 3, the cover member 8 has a box shape with an opening portion 80. That is, the cover member 8 has a plate member 81 in a substantially rectangular shape and a wall part 82 stood from the entire range of the edge of the plate member 81. The inside of the edge of the wall part 82 is the opening portion 80. Therefore, the cover member 8 is attached to the side plate 55 of the housing 5, and thereby, a space surrounded by the side plate 55 of the housing 5 and the plate member 81 and the wall part 82 of the cover member 8 is formed.

Further, the cover member 8 is detachably attached to the side plate 55 of the housing 5. The detachment mechanism is not particularly limited to, but includes e.g. screw fixation and an engagement portion having a lug.

As shown in FIG. 3, of the wall part 82, in a wall portion 821 located at the −z-axis side in the attachment state, an insertion portion 822 for insertion of the cable 200A to cable 200C is provided. The insertion portion 822 is formed by a cutout in a substantially rectangular shape. By the cutout, a gap is formed between the cover member 8 and the housing 5 in the attachment state. The cable 200A to cable 200C may be inserted through the gap and the cover member 8 may be attached to the housing 5 with the cable 200A to cable 200C coupled to the connector unit 6.

As described above, the cover member 8 has the insertion portion 822 through which the cables coupled to the connector unit 6 are inserted. Thereby, the cover member 8 may be attached to the housing 5 with the cable 200A to cable 200C coupled to the connector unit 6.

Note that, in the insertion portion 822, the part except the cable 200A to cable 200C may be sealed by a sealing member. Thereby, inflow of a liquid such as water (hereinafter, simply referred to as "liquid") from the outside of the cover member 8 via the insertion portion 822 may be prevented. It is preferable that the sealing member is formed using e.g. a porous material such as sponge. Thereby, as will be described later, the liquid is exhausted to the outside of the cover member 8 via the insertion portion 822, i.e., the sealing member.

Further, in the embodiment, a sealing member 83 is provided at the edge of the wall part 82, i.e., the edge of the opening portion 80. The sealing member 83 includes e.g. a member having elasticity such as rubber. By the sealing member 83, when the cover member 8 is attached to the housing 5, the sailing member 83 and the side plate 55 closely contact and the gap between the housing 5 and the cover member 8 may be made as small as possible. Therefore, the inflow of the liquid such as water from gap between the housing 5 and the cover member 8 may be suppressed. Hereinafter, a portion between the housing 5 and the cover member 8 is referred to as "coupling portion 10".

As described above, the sealing member 83 is provided in the coupling portion 10. Thereby, the flow of the liquid into the cover member 8 via the coupling portion 10 may be suppressed.

Although the sealing member 83 is provided, for example, when dust or the like is caught between the cover member 8 and the housing 5, liquid tightness is insufficient and the liquid may flow into the cover member 8 via the coupling portion 10. However, in the present disclosure, even when the liquid flows into the cover member 8, the liquid is hard to reach the connector unit 6 by the shielding part 9, which will be described later.

As below, the shielding part 9 will be explained.

As shown in FIGS. 3 to 6, the shielding part 9 is provided on the side surface of the housing 5, i.e., the side plate 55 and located between the coupling portion 10 and the connector unit 6. In other words, the shielding part is provided to surround the connector unit 6 inside of the cover member 8.

As shown in FIG. 4, the shielding part 9 is formed by a tubular body having a wall portion 91, a wall portion 92, a wall portion 93, and a wall portion 94 projecting toward the +y-axis side. The wall portion 91 to wall portion 94 are coupled to one another to form a nearly rectangular shape as seen from the +y-axis side. The wall portion 91 is located at the +z-axis side, the wall portion 92 is located at the −z-axis side, the wall portion 93 is located at the +x-axis side, and the wall portion 94 is located at the −x-axis side. Further, the shielding part 9 is located within a space surrounded by the +y-axis side surface of the side plate 55 as the side surface of the housing 5 and the cover member 8.

The wall portion 92 has an insertion portion 922 through which the cable 200A to cable 200C are inserted. The insertion portion 922 is formed by a cutout in a substantially rectangular shape. Thereby, the cable 200A to cable 200C may be routed to the outside of the cover member 8 with suppressed steep bending of the cable 200A to cable 200C.

According to the shielding part 9, even when the liquid flows in via the coupling portion 10 toward the connector unit 6, the wall portion 91 to wall portion 94 may shield the liquid and prevent the liquid from reaching the connector unit 6. Further, for example, it is not necessary to prepare the special connector disclosed in JP-A-2007-44767, and the flow of the liquid into the connector unit 6 may be effectively prevented by the simple configuration with the shielding part 9.

The shielding part 9 has the wall portion 91 to wall portion 94 provided to project into the space surrounded by the side surface of the housing 5, i.e., the +y-axis side surface of the side plate 55 and the cover member 8. Thereby, the liquid flowing in from the coupling portion 10 may be shielded regardless of the projection lengths of the wall portion 91 to wall portion 94, i.e., the lengths in the y-axis directions. Therefore, the liquid may be prevented from reaching the connector unit 6 more reliably.

The wall portion 91 to wall portion 94 surround the connector unit 6. Thereby, the liquid may be shielded regardless of the direction from which the liquid flows in of the coupling portion 10. Therefore, the liquid may be prevented from reaching the connector unit 6 more reliably.

The wall portion 91 is inclined toward the +z-axis side relative to the y-axis while extending toward the +y-axis side. The wall portion 92 is inclined toward the −z-axis side relative to the y-axis while extending toward the +y-axis side. The wall portion 93 is inclined toward the +x-axis side relative to the y-axis while extending toward the +y-axis side. The wall portion 94 is inclined toward the −x-axis side relative to the y-axis while extending toward the +y-axis side. According to the configuration, when the liquid flowing in via the coupling portion 10 moves toward the connector unit 6, the liquid moves against the inclinations of these inclined wall portion 91 to wall portion 94, and the liquid may be prevented from reaching the connector unit 6 more reliably.

As described above, the wall portion 91 to wall portion 94 are inclined to be farther from the connector unit 6 while separating from the +y-axis side surface of the side plate 55 as the side surface of the housing 5. Thereby, the liquid may be prevented from reaching the connector unit 6 more reliably.

The wall portion 91 has a wall portion 911 and a wall portion 912. The wall portion 91 projects to bend toward the +z-axis side in the center part and the +x-axis side with respect to the top part is the wall portion 911 and the −x-axis side is the wall portion 912. The wall portion 911 is inclined toward the −z-axis side relative to the x-axis while extending toward the +x-axis side. On the other hand, the wall portion 912 is inclined toward the −z-axis side while extending toward the −x-axis side. That is, the wall portion 911 and the wall portion 912 are inclined in the opposite directions to each other. According to the configuration, as shown in FIG. 7, the liquid flowing into the wall portion 91 is guided to flow toward the −x-axis side or the +x-axis side by the wall portion 911 or the wall portion 912.

Then, the guided liquid passes through between the wall portion 93 and the wall part 82 of the cover member 8 or between the wall portion 94 and the wall part 82 of the cover member 8 and moves to between the wall portion 92 and the wall portion 821 of the cover member 8. Then, the liquid is exhausted to the outside of the cover member 8 via the insertion portion 822. That is, the portion between the cover member 8 and the shielding part 9 functions as an exhaust path 90.

As described above, the robot 2 has the exhaust path 90 for exhausting the liquid flowing in from the coupling portion 10 around the connector unit 6 within the space surrounded by the +y-axis side surface of the side plate 55 as the side surface of the housing 5 and the cover member 8. Thereby, even when the liquid flows into the cover member 8, the liquid may be exhausted to the outside of the cover member 8 without flowing into the connector unit 6.

The insertion portion 822 is located between the placement surface on which the base 21 is placed and the connector unit 6. Thereby, the insertion portion 822 functions as an exhaust portion that exhausts the liquid flowing into the cover member 8 via the coupling portion 10. Therefore, accumulation of the liquid within the cover member 8 may be prevented.

The wall portion 91 to wall portion 94 have projecting portions 95 projecting toward the outside at the edges thereof. In other words, the wall portion 91 to wall portion 94 have the projecting portions 95 provided on the ends at the distal side with respect to the +y-axis side surface of the side plate 55 as the side surface of the housing 5 and projecting in directions away from the connector unit 6. According to the projecting portions 95, even when the liquid moves toward the edges of the wall portion 91 to wall portion 94, i.e., the +y-axis side, the projecting portions 95 stem the liquid and prevent the flow into the connector unit 6 side over the wall portion 91 to wall portion 94.

In the illustrated example, the shielding part 9 is separately formed from the housing 5. Thereby, the shielding part 9 may be retrofitted to an existing robot base. Note that a method of fixing the shielding part 9 to the housing 5 include e.g. screw fixation.

Further, it is preferable that the shielding part 9 is fixed to the housing 5 via a sealing member 96. Thereby, the liquid flowing into the connector unit 6 from between the shielding part 9 and the housing 5 may be prevented more reliably.

Note that, unlike the illustrated configuration, the shielding part 9 may be integrally formed with the housing 5.

As described above, the robot 2 includes the robot arm 20, the base 21 supporting the robot arm 20, and the cable 200A to cable 200C coupled to the base 21. Further, the base 21 has the housing 5 housing the circuit boards 50, the connector unit 6 located on the +y-axis side surface of the side plate 55 as the side surface of the housing 5 and electrically coupled to the circuit boards 50, to which the cable 200A to cable 200C are coupled, the cover member 8 having the insertion portion 822 through which the cable 200A to cable 200C are inserted and attached to the side surface of the housing 5 to cover the connector unit 6, and the wall portion 91 to wall portion 94 located between the coupling portion 10 by which the cover member 8 is coupled to the side surface of the housing 5 and the connector unit and provided to project from the side surface of the housing 5 within the space surrounded by the side surface of the housing 5 and the cover member 8. Thereby, even when the liquid flows in via the coupling portion 10, the wall portion 91 to wall portion 94 may shield the liquid and prevent the liquid from reaching the connector unit 6. Further, for example, it is not necessary to use the connector as disclosed in JP-A-2007-44767, and the flow of the liquid into the connector unit 6 may be effectively prevented by the simple configuration with the shielding part 9.

Second Embodiment

Figure 8:
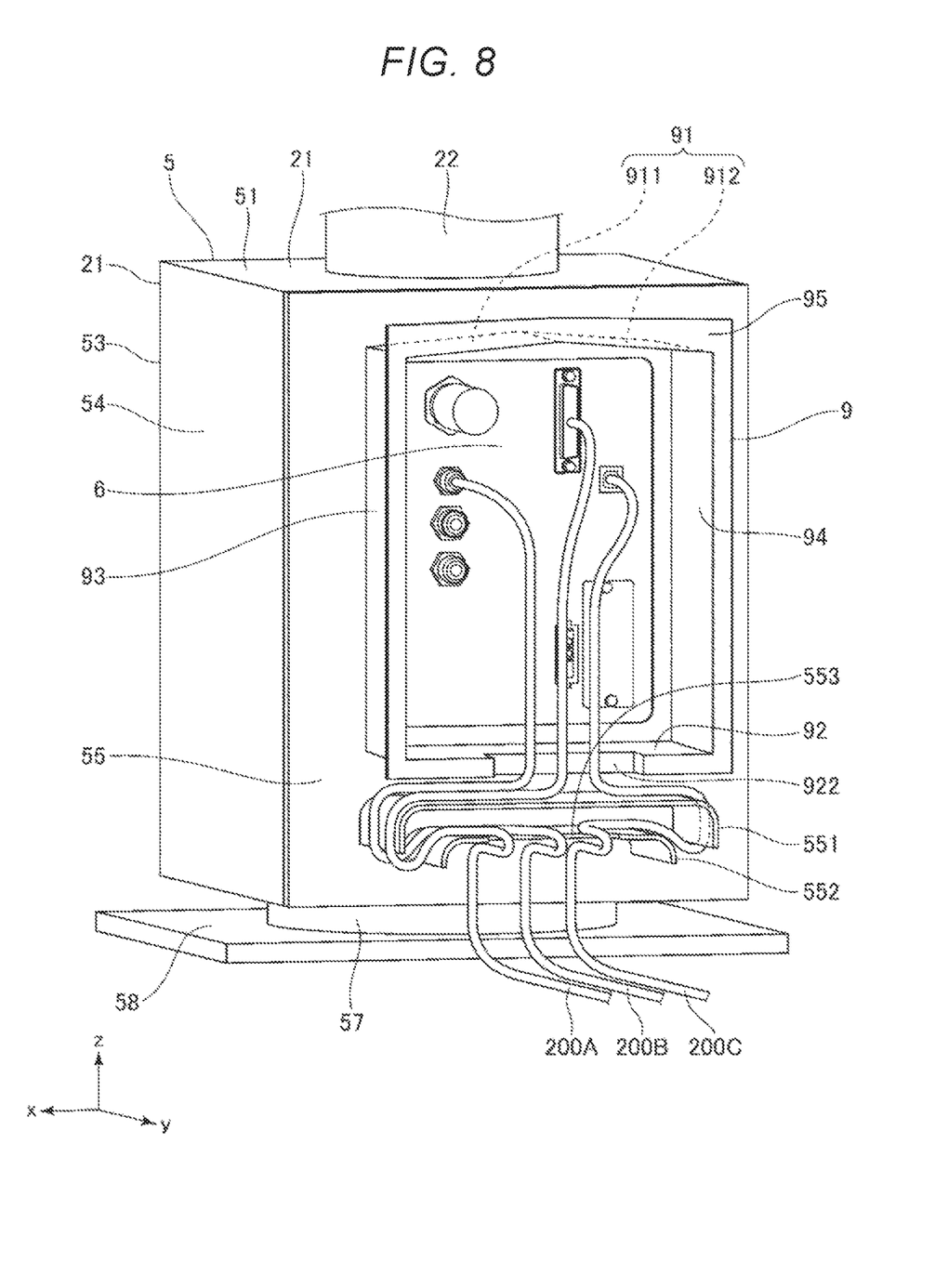
FIG. 8 is a perspective view of a base of a second embodiment of the robot according to the present disclosure.

FIG. 8 is the perspective view of the base of the second embodiment of the robot according to the present disclosure.

As below, the second embodiment of the robot according to the present disclosure will be explained with reference to FIG. 8, and the explanation will be made with a focus on the differences from the above described embodiment and the explanation of the same items will be omitted.

As shown in FIG. 8, in the embodiment, the housing 5 has a projecting portion 551 and a projecting portion 552 provided to project from the side plate 55 toward the +y-axis side. The projecting portion 551 and the projecting portion 552 are located at the −z-axis side of the shielding part 9 and at the +z-axis side of the wall portion 821 of the cover member 8 in the attachment state.

The projecting portion 551 has a plate-like shape and is placed to extend in the x-axis directions with the thickness along the z-axis directions. Further, both ends of the projecting portion 551, i.e., the end at the +x-axis side and the end at the −x-axis side are curved to bend toward the −z-axis side.

The projecting portion 552 is located at the −z-axis side of the projecting portion 551. The projecting portion 552 has a plate-like shape and is placed to extend in the x-axis directions with the thickness along the z-axis directions. Further, both ends of the projecting portion 552, i.e., the end at the +x-axis side and the end at the −x-axis side are curved to bend toward the −z-axis side. The projecting portion 552 is longer than the projecting portion 551. Further, the projecting portion 552 has an insertion portion 553 formed by a cutout in the center part thereof.

In the robot 2, the cable 200A to cable 200C pass through either side of the ends of the projecting portion 551, folded at the ends of the projecting portion 551, pass through between the projecting portion 551 and the projecting portion 552, and routed to the outside via the insertion portion 553 of the projecting portion 552.

According to the configuration, even when the liquid flows into the cover member 8 via the insertion portion 822 of the cover member 8, the liquid may be shielded by the projecting portion 551 and the projecting portion 552, and the liquid moving toward the insertion portion 922 of the shielding part 9 may be prevented more reliably. Therefore, the liquid flowing into the connector unit may be prevented more reliably.

As above, the robot according to the present disclosure is explained based on the illustrated embodiments, however, the present disclosure is not limited to those. The configurations of the respective parts may be replaced by arbitrary configurations having the same functions. Further, another arbitrary configuration may be added. Furthermore, the features of the respective embodiments may be combined.

In the above described embodiments, the number of rotation axes of the robot arm is three, however, the number is not limited to that in the present disclosure. The number of rotation axes of the robot arm may be e.g. two, four, or more. That is, in the above described embodiments, the number of arms is three, however, the number is not limited to that in the present disclosure. The number of arms may be e.g. two, four, or more.

What is claimed is:
1. A robot comprising:
a robot arm;
a base supporting the robot arm; and
a cable coupled to the base, wherein
the base has
a housing a circuit board,
a connector unit located on a side surface of the housing and electrically coupled to the circuit board, to which the cable is coupled,
a cover member having an insertion portion through which the cable is inserted and attached to the side surface of the housing to cover the connector unit, and
a wall portion located between a coupling portion by which the cover member is coupled to the side surface of the housing and the connector unit and provided to project from the side surface of the housing within a space surrounded by the side surface of the housing and the cover member.

2. The robot according to claim 1, wherein
the wall portion surrounds the connector unit.

3. The robot according to claim 1, wherein
the wall portion is inclined away from the connector unit while extending away from the side surface of the housing.

4. The robot according to claim 1, wherein
the wall portion has a projecting portion provided on an end at a distal side with respect to the side surface of the housing and projecting in a direction away from the connector unit.

5. The robot according to claim 1, further comprising an exhaust path for exhausting a liquid flowing in from the coupling portion around the connector unit within the space.

6. The robot according to claim 5, wherein
the insertion portion is located between a placement surface on which the base is placed and the connector unit.

7. The robot according to claim 1, wherein
a sealing member is provided in the coupling portion.

* * * * *